Feb. 4, 1958  R. F. GARNER  2,822,447
CONTROL DEVICE
Filed Aug. 10, 1956  2 Sheets-Sheet 1
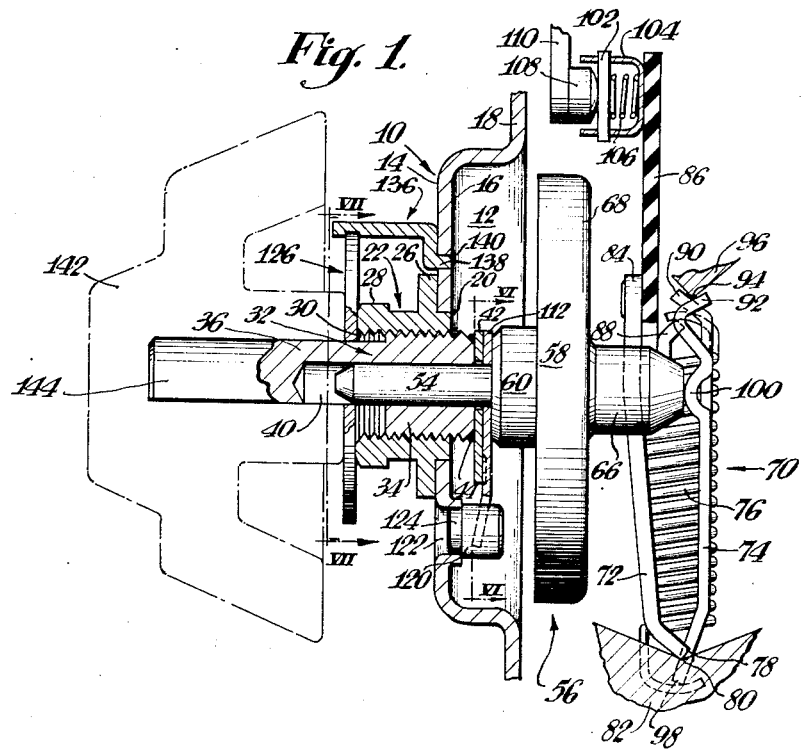
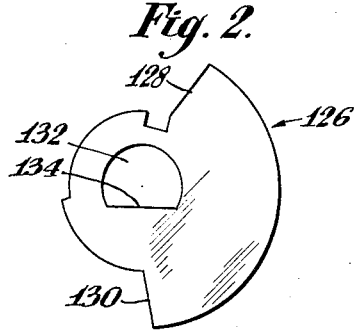
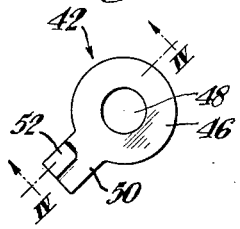
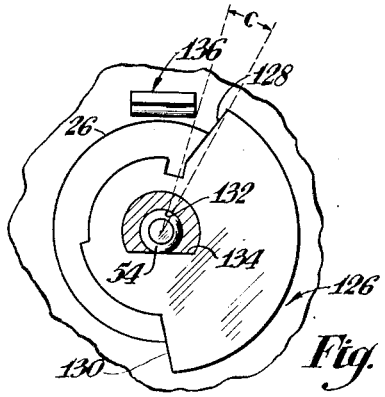
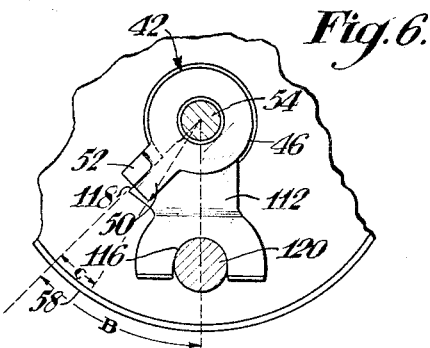

Feb. 4, 1958 R. F. GARNER 2,822,447
CONTROL DEVICE
Filed Aug. 10, 1956 2 Sheets-Sheet 2
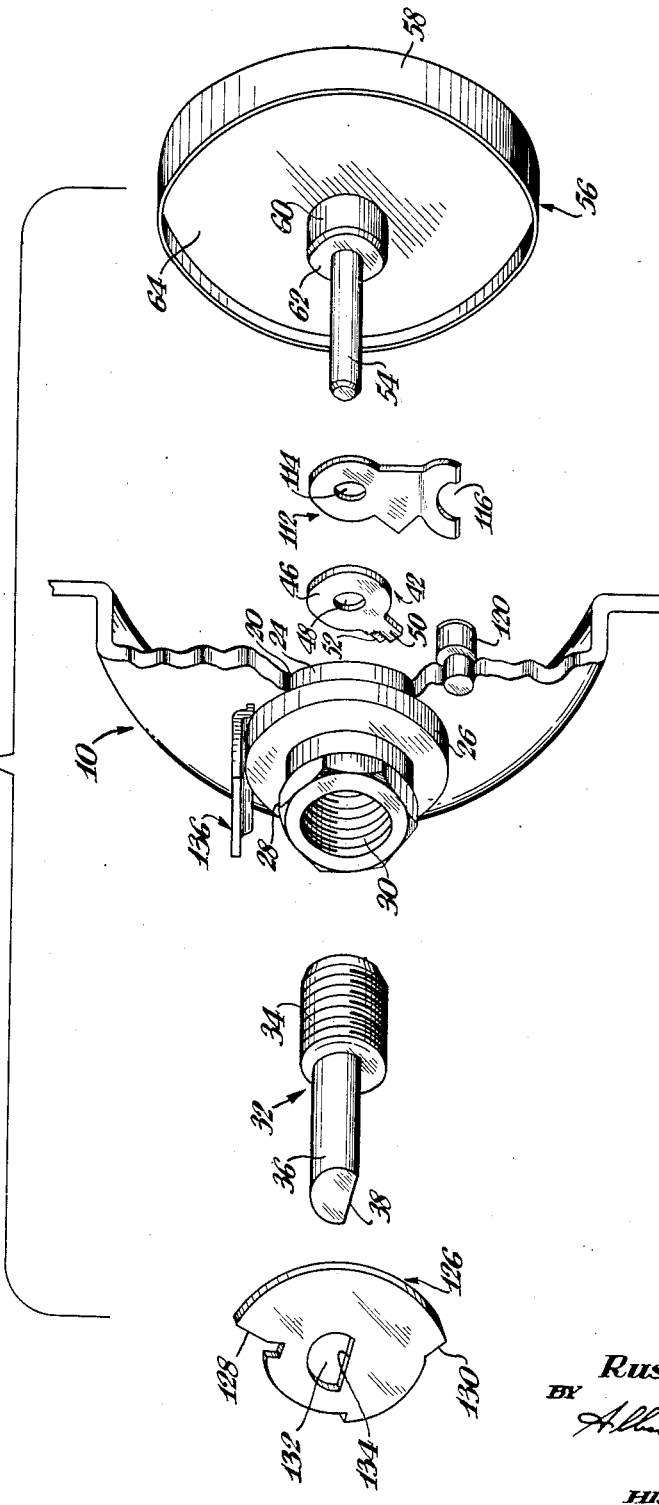
INVENTOR.
Russell F. Garner
BY
HIS ATTORNEY.

United States Patent Office 2,822,447
Patented Feb. 4, 1958

2,822,447

CONTROL DEVICE

Russell F. Garner, Youngwood, Pa., assignor to Robertshaw-Fulton Controls Company, Greensburg, Pa., a corporation of Delaware Application August 10, 1956, Serial No. 603,336

6 Claims. (Cl. 200—140)

This invention relates to a thermostatic control device and more particularly to a thermostatically controlled snap-switch provided with a manually operable cam means for shifting the position of the thermostatic element to immobilize or "open" the switch.

The subject control device is characterized by a thermostatic element which is mounted on a shaft that is slidably received in an axial passage in a threaded, manually operable adjustment screw. The adjustment screw carries a cam which cooperates with a thrust member when the adjustment screw is rotated through a predetermined angle to produce a predetermined axial separation or movement between the adjustment screw and the thermostatic element. This predetermined movement of the thermostatic element in turn moves the switch to the "open" position and the switch is permanently immobilized in this position irrespective of the temperature changes until the manually operable adjustment screw is moved in the opposite direction to disengage the cam and thrust member.

Accordingly, the primary object of the present invention is to immobilize the switch in a thermostatic control device by shifting the position of the thermostatic element.

Another object of the invention is to mount the thermostatic element of a thermostatic control device on a slidable shaft.

Another object of the invention is to control the shiftable movement of the thermostatic element in a thermostatic control device by means of a cam and thrust member.

Another object of the invention is to predetermine the rotation of the adjustment screw and simultaneously predetermine the shiftable movement of the thermostatic element in a thermostatic control device.

These and other objects of the present invention will become apparent from the following description taken in connection with the accompanying drawings wherein:

Fig. 1 is a side elevation of the thermostatic control device with some of the components shown in section;

Fig. 2 is a detail view of one of the components of the device;

Fig. 3 is a detail view of another of the components of the device;

Fig. 4 is a sectional view taken along the line IV—IV of Fig. 3;

Fig. 5 is an exploded perspective view of several of the components of the device prior to assembly;

Fig. 6 is a sectional view taken substantially along the line VI—VI of Fig. 1, the view including reference angles to show the structural and functional relationship between the various parts; and Fig. 7 is a sectional view taken substantially along the line VII—VII of Fig. 1, the view including reference angles to show the structural and functional relationship between the various parts.

Referring more particularly to Fig. 1, the thermostatic control device includes a casing or support means 10 having a recess 12 therein and provided with an outer wall 14, an inner wall 16 and a peripheral flange 18 thereon (shown cut away). The peripheral flange 18 may be attached by any suitable means (not shown in the drawing) to the wall of an oven or the like to rigidly attach the thermostatic control device in any desired position of intended use.

As best shown in Figs. 1 and 5, casing 10 is also provided with a centrally disposed aperture 20 therein which receives the end portion 24 of a hub member generally designated by the reference numeral 22. Hub 22 is provided with an annular flange 26 adjacent the right end thereof, viewing Fig. 1, and is provided with a hexagonal shaped flange 28 adjacent the left end thereof. Hub 22 may be attached to casing 10 by any suitable means, such as by press fitting hub portion 24 into casing aperture 20 or by welding hub flange 26 to outer casing wall 14.

Hub 22 is also provided with a threaded, axially extending bore 30 therein which carries a manually operable adjustment screw generally designated by the reference numeral 32. Adjustment screw 32 is provided with an annular threaded portion 34 and a shaft portion 36, the shaft portion 36 having a flat 38 extending longitudinally thereof. Adjustment screw 32 is also provided with an axially extending passage 40 therein, the purpose of passage 40 to be explained in detail hereinafter.

Referring to Figs. 1, 3, and 4, the right end of adjustment screw 32 (viewing Fig. 1) has attached thereto an operating element in the form of a cam plate generally designated by the reference numeral 42. The cam plate 42 is attached to adjustment screw 32 by any suitable means, such as welding or brazing, fillets being shown at 44. The cam plate 42 is comprised of an annular disc 46 having a centrally disposed aperture 48 therein and provided with a tang 50 integrally formed thereon. A portion of the tang is recessed to provide a camming surface or projection 52 extending from one face thereof.

Adjustment screw passage 40 is adapted to slidably receive therein an elongated shaft 54. At the right end thereof (viewing Figs. 1 and 5), shaft 54 is attached to an expansible and contractible thermostatic element or thermally responsive means generally designated by the reference numeral 56. The thermostatic element 56 includes a hollow shell 58 which contains a liquid or gas that changes in volume in response to changes in a temperature condition to produce an expansion or a contraction of the shell. A hub 60 having a flat face 62 thereon is attached to one face 64 of the shell 58, and a thrust button 66 is attached to the opposite face 68 of the shell. Inasmuch as thermostatic elements of this conventional type are well known in the art, further discussion thereof is deemed unnecessary.

As shown in Fig. 1, the thermostatic element 56 is adapted to cooperate with a snap mechanism generally designated by the reference numeral 70. The snap mechanism 70 includes a pair of spaced arms 72 and 74 joined by a tension spring 76. One end 78 of arm 72 is seated in a notch 80 of an abutment 82 (shown cutaway) while the opposite end 84 thereof has attached thereto a strip of insulating material 86. Intermediate the ends thereof, arm 72 is provided with an ear 88 which anchors one end of tension spring 76. Arm 74 is bifurcated intermediate its ends and the bifurcated portions 90 and 92 are crossed adjacent their extremities and seated at their point of intersection on a projecting corner 94 of an abutment 96 (shown cutaway). The opposite end 98 of arm 74 (shown in dotted lines) anchors the other end of tension spring 76. Arm 74 is also reversely bent intermediate its ends at 100 to provide a bearing surface for the thermostatic element thrust button 66. Inasmuch as snap mechanisms of this type are well known in the art, further discussion thereof is, also, deemed unnecessary.

Snap mechanism 70 is adapted to control the movement of a switch contact 102 slidably carried by a U-shaped frame member 104 mounted on the upper extremity of insulating strip 86. A compression spring 106 is mounted between switch contact 102 and U-shaped frame member 104. Switch contact 102 is adapted to cooperate with an opposing switch contact 108 which is mounted on the end of a supporting member 110 (shown cutaway).

Referring to Figs. 1, 5, and 6, a thrust member, generally designated by the reference numeral 112, is carried by shaft 54 and is positioned between cam plate 42 and the flat end face 62 of thermostatic element hub 60. The thrust element 112, viewing Fig. 5, is provided with an aperture 114 therein adjacent the upper end thereof and is provided with a semicircular cutaway portion 116 at the lower edge thereof. Thrust member 112 is also provided with a straight-line edge 118 along the left extremity thereof, the edge 118 (as best shown in Fig. 6) coinciding with an imaginary radius drawn from the center of aperture 114. The position of edge 118 on thrust member 112 can also be determined in Fig. 6 by reference to angle "B."

With the upper portion of thrust member 112 being slidably journalled on shaft 54, the lower cutaway portion of thrust member 112 is adapted to engage the peripheral surface of a pin 120 seated in an aperture 122 in casing 10. The pin 120 is reduced in diameter at one end thereof to provide a shoulder 124 thereon which is engaged by the wall of the aperture 122. The pin 120 may be retained in the aperture 122 by any suitable means, preferably by press fitting the shoulder 124 into engagement with the wall of the aperture 122. With the pin 120 circumferentially engaged by cutaway portion 116, the pin 120 thus prevents rotation of thrust member 112.

Referring to Figs. 1, 2, 5, and 7, portion 36 of adjustment screw 32 has mounted thereon an irregular-shaped stop plate generally designated by the reference numeral 126. Stop plate 126 has formed on the periphery thereof a pair of straight-line edges 128 and 130 and is provided with an aperture 132 therein having a flat portion 134 in the periphery thereof. Flat portion 134 is adapted to register with the flat 38 on the adjustment screw 32 to prevent rotation of stop plate 126 relative to the adjustment screw.

A stop member 136 extends laterally of casing 10 and is adapted to cooperate with stop plate 126 to limit or predetermine the angular rotation thereof. Stop member 136 is generally rectangular in shape and is provided with a right angular bent portion 138 on one end thereof. Bent portion 138 is seated within a rectangular slot 140 in casing 10 and is retained therein by any suitable means, preferably by press fitting or welding. Viewing Fig. 7, it can be seen that edge 128 on stop plate 126 is adapted to abut stop member 136 to limit the counterclockwise rotation of the stop plate 126 and edge 130 is adapted to abut the stop member 136 to limit the clockwise rotation of the stop plate 126.

As shown in phantom in Fig. 1, portion 36 of the adjustment screw 32 also has mounted thereon a knob or dial 142 having an axial passage 144 therein, passage 144 being identical in configuration to the configuration of portion 36 of the adjustment screw. When the dial 142 is rotated in one direction or the other, the adjustment screw 132 will be moved axially within threaded bore 30 of hub 22 to shift the position of the thermostatic element 56 relative to the snap mechanism 70.

*Operation*

Referring to Fig. 1, it will be noted that the thermostatically controlled snap mechanism 70 is urging the switch contacts 102 and 108 into engagement. Portion 46 of cam plate 42 is also in engagement with the upper portion of thrust member 112 and the edge 128 of stop plate 126 (viewing Fig. 7) is located a fixed distance from stop member 136, the fixed distance being represented by the angle "C." It will also be noted (viewing Fig. 6) that projection 52 on cam plate tang 50 is in engagement with edge 118 on thrust member 112. Thus, with the components of the device in their relative positions shown by Fig. 1, switch contacts 102 and 108 are being thermostatically controlled to move between the "open" and "closed" positions in response to changes in a temperature condition affecting the thermostatic element 56.

However, if it is desired to move the switch contacts 102 and 108 into a permanently "open" position and thus terminate the operation of the thermostatic control device, it becomes necessary to immobilize the snap mechanism 70. To this end, the dial 142 is rotated to move stop plate 126 in a counterclockwise direction (viewing Fig. 7) until the edge 128 thereon engages stop member 136; that is, stop plate 126 is rotated counterclockwise through angle "C." In rotating stop plate 126 counterclockwise through angle "C," cam plate 42 (viewing Fig. 6) will also be rotated counterclockwise through angle "C," and the projection 52 on cam plate 42 will move across the edge 118 on the thrust member 112 and thus produce an axial separation of the cam plate and the thrust member.

The axial separation between the cam plate 42 and the thrust member 112 will in turn produce a shifting movement of the thermostatic element 56 which will move snap mechanism lever 74 to the right (viewing Fig. 1) and thus separate the switch contacts 102 and 108. With the snap mechanism 70 "snapped" to the right by axial movement of the thermostatic element 56, the switch contacts 102 and 108 will remain permanently disengaged as long as the projection 52 on cam plate 42 is in engagement with the thrust member 112.

If it is again desired to resume the thermostatic control of switch contacts 102 and 108, stop plate 126 is rotated clockwise (viewing Fig. 7) through angle "C," to disengage cam plate projection 52 and thrust member 112. Thermostatic element 56 will then be shifted to the left (viewing Fig. 1) and the switch contacts 102 and 108 will again be moved between the "open" and "closed" positions in response to changes in a temperature condition.

While only one embodiment of the present invention has been shown and described herein, it will be apparent to those skilled in the art that the construction and arrangement of parts in the present invention may be variously embodied or changed without departing from the scope of the invention as defined in the appended claims.

It is claimed and desired to secure by Letters Patent:

1. In a control device, the combination comprising support means, rotatable means adjustably mounted on said support means for axial and rotary movement relative thereto, thermally responsive means slidably mounted in said rotatable means for axial movement relative thereto, switch means operatively connected to said thermally responsive means and being movable by said thermally responsive means between a plurality of controlling positions in response to changes in a temperature condition, and an operating element carried by said rotatable means and operatively associated with said thermally responsive means during a predetermined rotation of said rotatable means for producing a predetermined movement of said thermally responsive means relative to said rotatable means and said switch means to thereby move said switch means to one of said controlling positions irrespective of a change in a temperature condition.

2. A control device comprising, in combination, support means, rotatable means threadedly mounted on said support means for axial and rotary movement relative thereto, thermally responsive means slidably mounted in said rotatable means for axial movement relative thereto, switch means operatively connected to said thermally responsive means and being movable by said thermally responsive means between a plurality of controlling positions in response to changes in a temperature condition, and an operating element fixed to said rotatable means and operatively associated with said thermally responsive means during a predetermined degree of rotation of said rotatable means for imparting a predetermined movement to said thermally responsive means relative to said rotatable means and said switch means, said predetermined movement of said thermally responsive means being operable to move said switch means to one of said controlling positions irrespective of a change in a temperature condition and operable to retain said switch means in said one controlling position.

3. In a control device, the combination comprising support means, rotatable means threadedly mounted on said support means for axial and rotary movement relative thereto, thermally responsive means slidably mounted in said rotatable means for axial movement relative thereto, switch means operatively connected to said thermally responsive means and movable by said thermally responsive means between a plurality of controlling positions in response to changes in a temperature condition, said switch means comprising a snap mechanism and a switch contact member insulatedly connected to said snap mechanism, an operating element fixed to said rotatable means and rotatable therewith, and thrust means cooperable with said operating element and said thermally responsive means for transmitting a predetermined movement to said thermally responsive means upon a predetermined rotation of said operating element whereby said switch means is moved by said thermally responsive means to one of said controlling positions, said switch means being retained in said one controlling position irrespective of changes in a temperature condition.

4. In a control device, the combination comprising support means having a bore therein, rotatable means threadedly mounted in said bore and movable relative to said support means, thermally responsive means slidably mounted in said rotatable means for axial movement relative thereto, switch means operatively connected to said thermally responsive means and movable by said thermally responsive means between a plurality of controlling positions in response to changes in a temperature condition, cam means fixed to said rotatable means and rotatable therewith, means carried by said rotatable means to predetermine the amount of rotation thereof, and thrust means cooperable with said cam means for producing a predetermined movement of said thermally responsive means relative to said rotatable means and said switch means upon a predetermined rotation of said rotatable means, said predetermined movement of said thermally responsive means being operative to move said switch means to one of said controlling positions and said cam means being operative to retain said switch means in said one controlling position irrespective of changes in a temperature condition.

5. In a control device, the combination comprising support means having a bore therein, rotatable means threadedly mounted in said bore and capable of movement therein relative to said support means, thermally responsive means slidably mounted in said rotatable means for axial movement relative thereto, switch means operatively connected to said thermally responsive means and being movable by said thermally responsive means between a plurality of controlling positions in response to changes in a temperature condition, a plate fixed to said rotatable means and rotatable therewith, said plate having a projection thereon, stop means fixed to said support means, means carried by said rotatable means and cooperable with said stop means to predetermine the movement of said rotatable means, and a thrust member positioned between said plate and said thermally responsive means and adapted to be engaged by said projection on said plate when said rotatable means is rotated through a predetermined range of movement, said engagement of said plate projection and said member being operative to produce a separation of said plate and said member to produce a predetermined movement of said thermally responsive means relative to said rotatable means and said switch means whereby said switch means is moved by said thermally responsive means to one of said controlling positions and retained in said one controlling position.

6. In a control device, the combination comprising support means, rotatable means having an axial passage therein and threadedly mounted in said support means, for axial and rotary movement relative to said support means, thermally responsive means including a hollow shell for containing an expansible fluid therein and a shaft, said shaft journaled in said passage in said rotatable means whereby said thermally responsive means is capable of axial movement relative to said rotatable means, switch means operatively connected to said thermally responsive means and being movable by said thermally responsive means between a plurality of controlling positions in response to changes in a temperature condition, a plate having a projection thereon fixed to said rotatable means for rotation therewith, means carried by said rotatable means to predetermine the rotation of said rotatable means, and a thrust member carried by said shaft and positioned between said plate and said thermally responsive means, said thrust member engaged by said projection on said plate when said rotatable means is moved through a predetermined range of movement to produce a predetermined relative axial movement between said rotatable means and said thermally responsive means whereby said thermally responsive means moves said switch means to one of said controlling positions and retains said switch means in said one controlling position irrespective of a change in a temperature condition.

References Cited in the file of this patent
UNITED STATES PATENTS

| | | |
|---|---|---|
| 2,023,119 | Biebel | Dec. 3, 1935 |
| 2,157,857 | Lee | May 9, 1939 |